US011028822B2

(12) United States Patent
Bader et al.

(10) Patent No.: US 11,028,822 B2
(45) Date of Patent: Jun. 8, 2021

(54) WIND TURBINE AIRFOIL STRUCTURE FOR INCREASING WIND FARM EFFICIENCY

(71) Applicant: University of Massachusetts, Boston, MA (US)

(72) Inventors: Shujaut Bader, Amherst, MA (US); Blair Perot, Amherst, MA (US)

(73) Assignee: University of Massachusetts, Boston, MA (US)

( * ) Notice: Subject to any disclaimer, the term of this patent is extended or adjusted under 35 U.S.C. 154(b) by 3 days.

(21) Appl. No.: 16/288,976

(22) Filed: Feb. 28, 2019

(65) Prior Publication Data
US 2019/0383261 A1    Dec. 19, 2019

Related U.S. Application Data

(60) Provisional application No. 62/687,026, filed on Jun. 19, 2018.

(51) Int. Cl.
*F03D 9/00* (2016.01)
*H02P 9/04* (2006.01)
*F03D 1/04* (2006.01)
*F03D 80/80* (2016.01)

(52) U.S. Cl.
CPC ............... *F03D 1/04* (2013.01); *F03D 80/80* (2016.05)

(58) Field of Classification Search
CPC ................................... F03D 1/04; F03D 80/80
See application file for complete search history.

(56) References Cited

U.S. PATENT DOCUMENTS

| 9,512,817 | B2 * | 12/2016 | Wood | F03D 1/025 |
| 10,280,895 | B1 * | 5/2019 | Keeley | F03D 1/04 |
| 2008/0232957 | A1 * | 9/2008 | Presz | F03D 13/20 |
| | | | | 415/191 |
| 2011/0008164 | A1 * | 1/2011 | Presz, Jr. | F03D 1/04 |
| | | | | 415/211.2 |
| 2011/0020107 | A1 * | 1/2011 | Presz, Jr. | F03D 1/04 |
| | | | | 415/4.1 |
| 2012/0141250 | A1 * | 6/2012 | Kinzie | F03D 1/04 |
| | | | | 415/1 |

(Continued)

OTHER PUBLICATIONS

Bloumakis, Evangelos, "Improving the Wind Farm efficiency by simple means", Master of Science Thesis—Sep. 8, 2015, 126 pgs.

*Primary Examiner* — Tulsidas C Patel
*Assistant Examiner* — Thomas K Quigley
(74) *Attorney, Agent, or Firm* — Schwegman Lundberg & Woessner, P.A.

(57) ABSTRACT

A wind turbine comprises a nacelle, a drive shaft extending from the nacelle along a shaft axis, a plurality of turbine blades coupled to the drive shaft and extending radially relative to the shaft axis, and a first static airfoil structure coupled to the wind turbine to influence airflow exiting the plurality of turbine blades. A method of increasing wind turbine efficiency in a wind farm comprises positioning a first wind turbine having a first plurality of turbine blades at least partially upstream of a second wind turbine having a second plurality of turbine blades, producing a wake field of exit air behind the first plurality of turbine blades, directing air outside of the wake field into the wake field to increase speed of airflow in the wake field, and directing the airflow into the second plurality of turbine blades of the second wind turbine.

27 Claims, 13 Drawing Sheets

(56) References Cited

U.S. PATENT DOCUMENTS

| | | | | |
|---|---|---|---|---|
| 2012/0256424 A1* | 10/2012 | Marin | F03D 1/04 | 290/55 |
| 2012/0261517 A1* | 10/2012 | Turner | B64C 9/24 | 244/203 |
| 2012/0315125 A1* | 12/2012 | Presz | F03D 1/04 | 415/1 |
| 2013/0156596 A1* | 6/2013 | Himmelmann | F03D 80/70 | 416/244 R |
| 2013/0309081 A1* | 11/2013 | Hjort | F03D 1/04 | 415/211.2 |
| 2014/0030059 A1* | 1/2014 | Presz, Jr. | F03D 9/25 | 415/1 |
| 2014/0112777 A1* | 4/2014 | Kalra | F03D 7/048 | 416/1 |
| 2014/0207297 A1* | 7/2014 | Betran Palomas | F03D 7/048 | 700/287 |
| 2014/0227095 A1* | 8/2014 | Minutin | F03D 15/00 | 416/9 |
| 2015/0063978 A1* | 3/2015 | Poole | F03D 3/04 | 415/4.2 |
| 2017/0314529 A1* | 11/2017 | Mansberger | F03D 9/25 | |
| 2018/0045182 A1* | 2/2018 | Westergaard | F03D 7/0276 | |
| 2018/0149134 A1* | 5/2018 | Keeley | F03D 1/0633 | |
| 2020/0056581 A1* | 2/2020 | Mansberger | F03D 1/0666 | |

* cited by examiner

WIND TURBINE AIRFOIL STRUCTURE FOR INCREASING WIND FARM EFFICIENCY

CLAIM OF PRIORITY

This application claims the benefit of U.S. Provisional Patent Application Ser. No. 62/687,026, filed on Jun. 19, 2018, the benefit of priority of which is claimed hereby, and which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document or portions incorporated herein by reference: Copyright Shujaut Bader, Boston, Mass., U.S.A. and Blair Perot, Boston, Mass., U.S.A. All Rights Reserved.

TECHNICAL FIELD

This document pertains generally, but not by way of limitation, to wind turbines and wind turbine farms.

BACKGROUND

Efficiency of individual wind turbines often focuses on the shape, orientation, or stiffness of turbine blades used in the wind turbine. However, individually increasing wind turbine efficiency does not always account for wind turbines installed in wind farms where wake effects from other wind turbines can affect the efficiency of an individual wind turbine. Wind turbines are often used in wind farms where multiple wind turbines are arranged in various arrays that result in upstream wind turbines obstructing or partially obstructing the free entry of wind into downstream wind turbines. Previous attempts to mitigate such problems have involved the use of tethered kites that attempt to mix fast and slow moving air within a wind farm array in order to reduce or eliminate the presence of slow moving air with the wind farm array. Tethered kite systems are described in Improving the Wind Farm Efficiency by Simple Means, LES study of a wind turbine array with tethered kites, by Evangelos Ploumakis, Delft University of Technology Masters of Science Thesis, Sep. 8, 2015.

Overview

The present inventors have recognized, among other things, that a problem to be solved can include inefficiencies that can potentially be introduced in wind turbine applications where one or more wind turbines are located downstream or partially downstream of other wind turbines. Wind passing through the blades of the upstream wind turbine produces a wake that can influence the wind passing through the blades of the downstream turbines. The inventors have recognized that airflow from the upstream turbine can be slowed as energy is extracted by the blades of the upstream wind turbine. In particular, the present inventors have recognized that a downstream wind turbine can lose 15%-20% of its operational power due to wake effects of one or more upstream wind turbines.

The present inventors have recognized that previous tethered kite systems can be inefficient from both a wind speed and economics standpoint. Tethered kite systems are designed to improve overall wind farm wind speeds by mixing high speed wind and low speed wind within the wind farm to produce medium speed air, thereby eliminating the slow moving wind from the entire wind farm array. These kite systems require tethering a large number of kites to the ground throughout the wind farm array. The kites are anchored separate from any particular wind turbine. Thus, the kites randomly mix air within the wind farm depending on the direction that the wind is blowing. The kites, therefore, cannot be equally efficient for all wind directions.

The present subject matter can help provide a solution to this and other problems, such as by using an airfoil structure to increase the speed of the airflow in the downstream wake of a wind turbine to increase the efficiency of a downstream wind turbine. The airfoil structure can be statically attached to an individual wind turbine, such as at the nacelle, to thereby always most efficiently interact with the wake field of such wind turbine regardless of wind direction. The airfoil structure can be configured to displace slow moving wind that has passed through the turbine blades with faster moving wind that is flowing above, below or laterally beyond the length of the turbine blades. In other words, the static airfoil structure can be used to pull surrounding high speed wind into the wake of the wind turbine to push the slowed down wind out of the wake field.

This overview is intended to provide an overview of subject matter of the present patent application. It is not intended to provide an exclusive or exhaustive explanation of the invention. The detailed description is included to provide further information about the present patent application.

DETAILED DESCRIPTION

Figure 1:
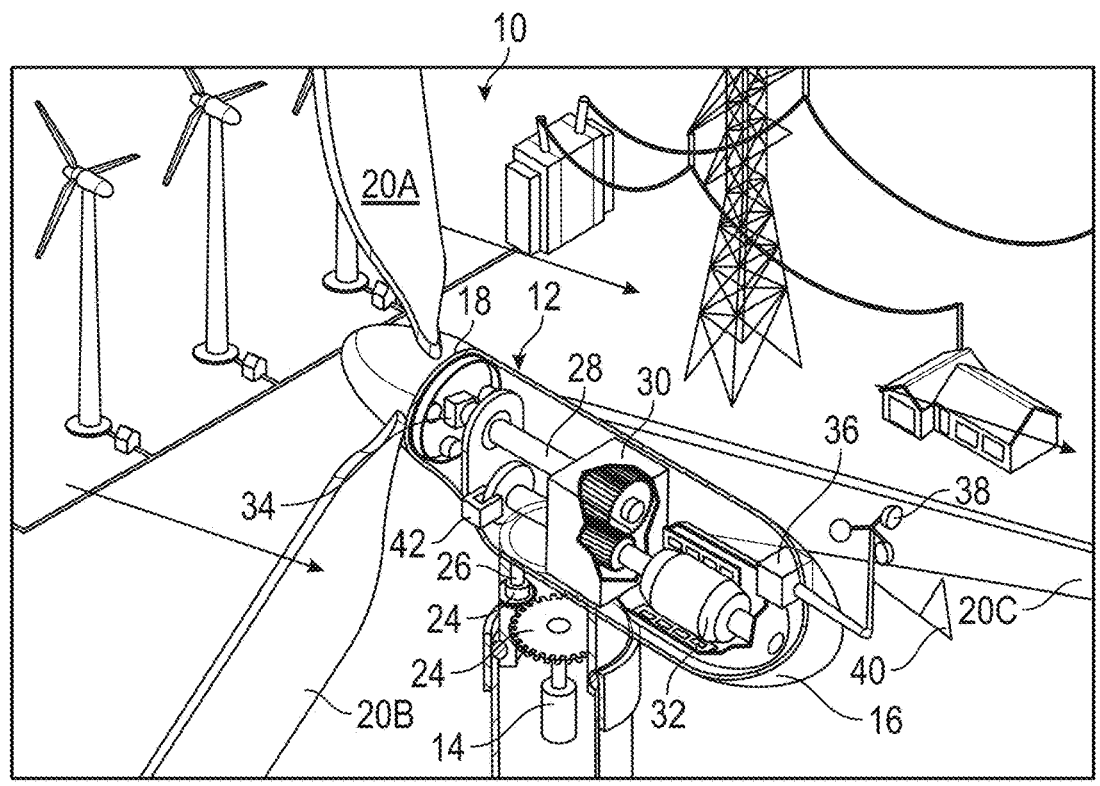
FIG. 1 is a schematic perspective view of a conventional wind turbine system illustrating various components of a wind turbine.

FIG. 1 is a schematic perspective view of wind turbine system 10 illustrating various components of wind turbine 12. The various airfoil structures described herein can be incorporated into wind turbine 12, as well as other wind turbines. Wind turbine 12 can include tower 14, nacelle 16, rotor 18 and blades 20A, 20B and 20C. Tower 14 can include yaw motor 22, and yaw drive 24. Mounting shaft 26 can extend from yaw drive 24 to support nacelle 16 and other components of wind turbine 12. Nacelle 16 can have located therein drive shaft 28, gear box 30 and generator 32. Rotor 18 can be mounted to drive shaft 28 and blades 20A-20C can be mounted to rotor 18. Wind turbine 12 can include other components such as pitch system 34, controller 36, anemometer 38, wind vane 40 and brake 42. Wind turbine 12 can operate in a conventional manner. Nacelle 16 can freely pivot relative to tower 14, such as can be influenced via directionality of wind encountering blades 20A, 20B and 20C. Additionally, nacelle 16 can be pivoted relative to tower 14 via yaw motor 22 and yaw drive 24.

Wind W flows through blades 20A-20C to cause rotation of rotor 18 on drive shaft 28 along a drive shaft axis. Input from drive shaft 28 into gear box 30 causes generator 32 to operate and produce electrical power, which can be provided to a power sub-station, an electrical grid, a battery or end-users, such as residential housing. As wind W flows through blades 20A-20C, energy is extracted and the velocity of wind W is reduced accordingly. Thus, as wind W flows from wind turbine 12 to a downstream wind turbine, wind W becomes less effective at turning turbine blades and generating electrical power.

Figure 2:
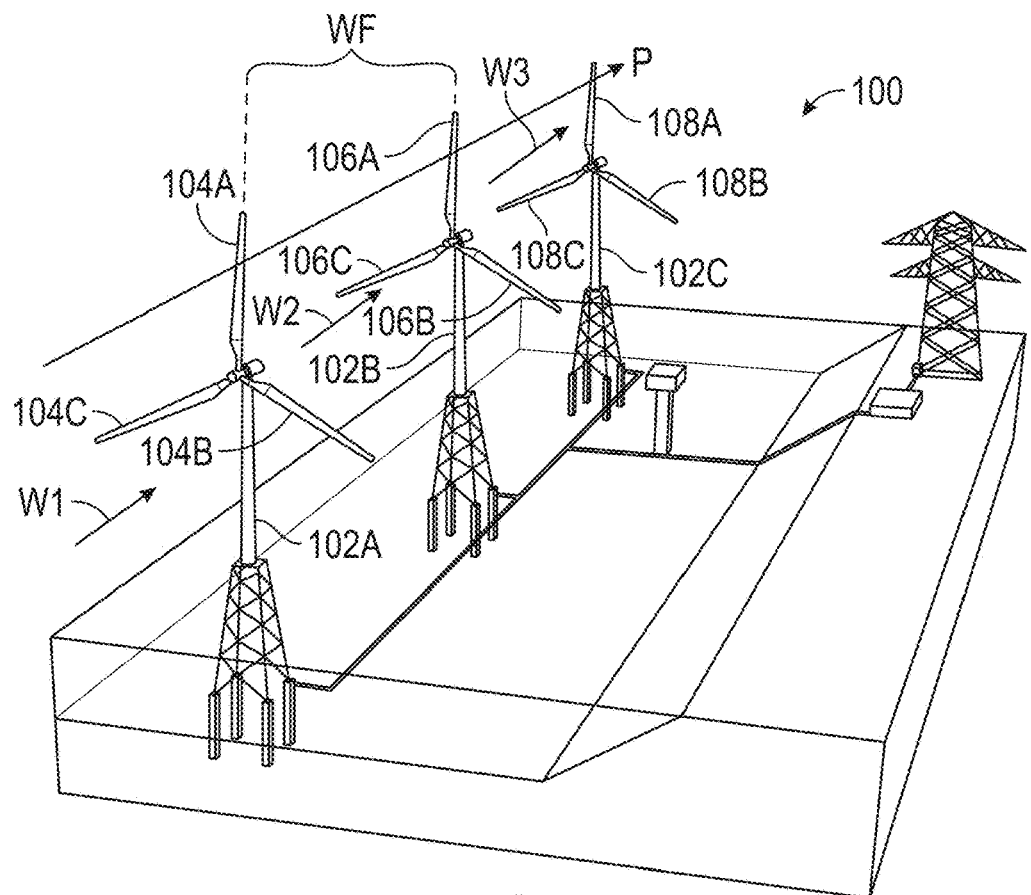
FIG. 2 is a schematic perspective view of a conventional wind farm including a plurality of wind turbines arranged in line with each other along a wind path.

FIG. 2 is a schematic perspective view of wind farm 100 including a plurality of wind turbines, including wind turbine 102A, 102B and 102C, arranged in line with each other along wind path P. Unobstructed wind W1 enters blades 104A, 104B and 104C of turbine 102A and energy is extracted therefrom by blades 104A-104C. Wind W1 leaves blades 104A-104C and forms wake field WF downstream of turbine 102A. Wind W2 within wake field WF has a speed that is reduced from the speed of wind W1. Thus, Wind W2 is less effective in turning turbine blades 106A, 106B and 106C. Wind W2 forms an additional wake field downstream of turbine 102. Speed of wind W3 is subsequently reduced by blades 108A, 108B and 108C as the process repeats as wind travels through each subsequent wind turbine.

Figure 3A:
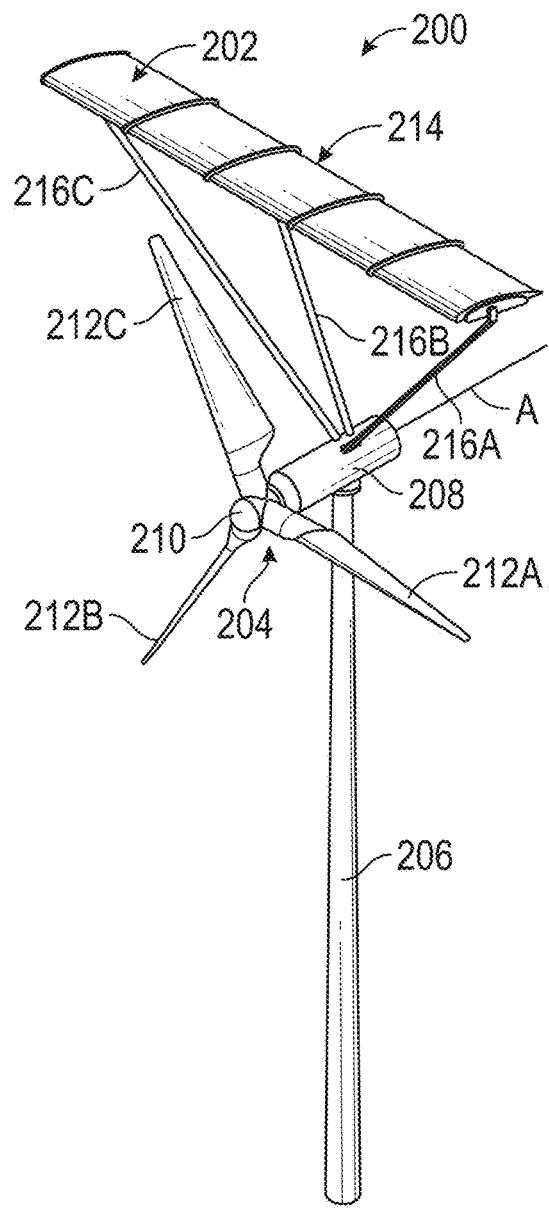
FIG. 3A is a schematic perspective view of a wind turbine system incorporating an example static airfoil structure of the present application.
Figure 3B:
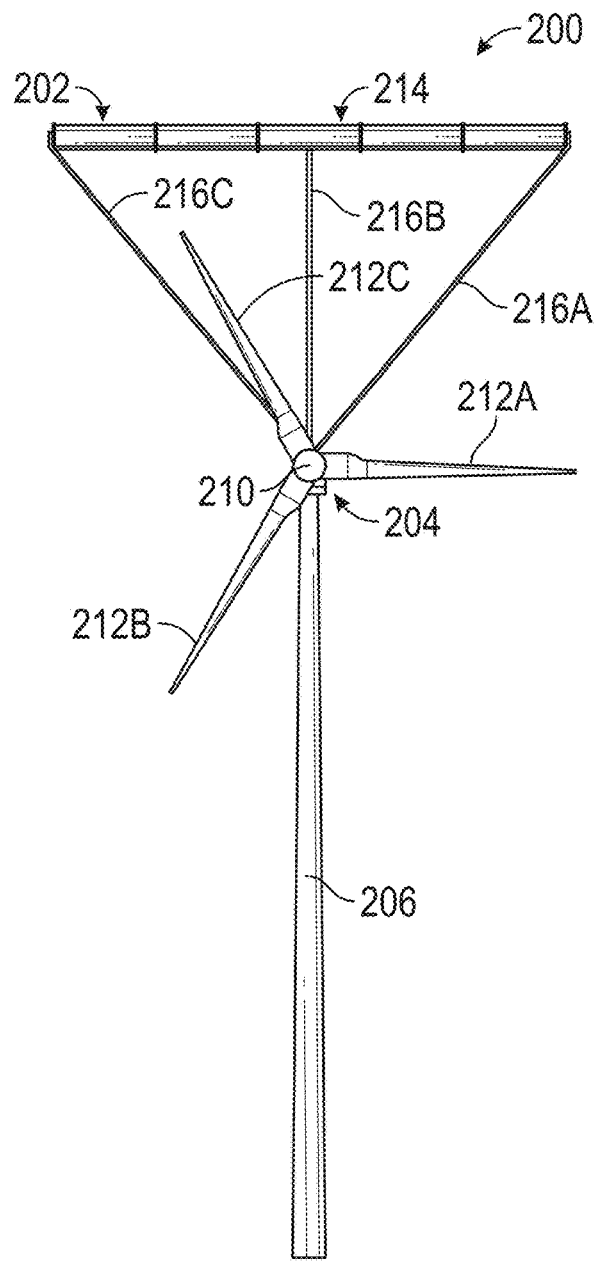
FIG. 3B is a front view of the wind turbine system and static airfoil structure of FIG. 3A.
Figure 3C:
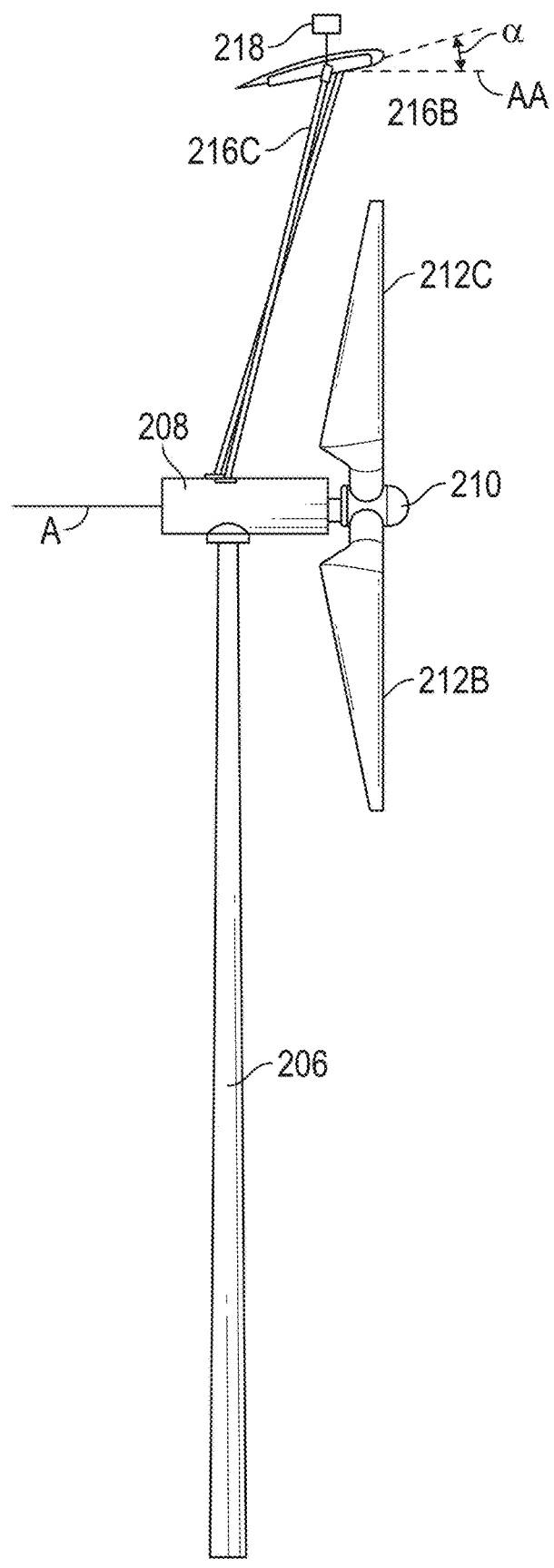
FIG. 3C is a side view of the wind turbine system and static airfoil structure of FIG. 3A.

FIG. 3A is a schematic perspective view of wind turbine system 200 incorporating an example static airfoil structure 202 of the present application. FIG. 3B is a front view of wind turbine system 200 and static airfoil structure 202 of FIG. 3A. FIG. 3C is a side view of wind turbine system 200 and static airfoil structure 202 of FIG. 3A. FIGS. 3A-3C are discussed concurrently.

Wind turbine system 200 can include wind turbine 204, which can be mounted on tower 206. In particular, nacelle 208 can be mounted to tower 206 via a mounting shaft and rotor 210 can be mounted to nacelle 208 via a drive shaft. Blades 212A, 212B and 212C can be mounted to rotor 210. Airfoil structure 202 can be mounted to wind turbine 204, such as at nacelle 208. Airfoil structure 202 can comprise airfoil 214 and struts 216A, 216B and 216C.

Nacelle 208 can rotate relative to tower 206. Airfoil structure 202, rotor 210 and blades 212A-212C are coupled to nacelle 208 so as to be static relative to rotation between nacelle 208 and tower 206. Nacelle 208 can be rotated such that the major axis A of nacelle 208 aligns in the direction of incoming wind, with rotor 210 and blades 212A-212C being positioned upstream of airfoil structure 202. Blades 212A, 212B and 212C can be mounted to rotor 210 to extend radially relative to axis A.

Airfoil structure 202 can be positioned to affect the wake field of wind that has passed through blades 212A-212C. Tower 206 is positioned inboard of nacelle 208. In the example shown, airfoils structure 202 is positioned outboard of nacelle 208. In particular, struts 216A-216C can be positioned outboard of nacelle 208. Struts 216A-216B can have a length sufficient to place airfoil 214 radially outward of blades 212A-212C. As can be seen in FIG. 3C, struts 216A-216C are connected to nacelle 208 downstream of airfoils 212A-212C and are configured to position airfoil 214 radially outward of airfoils 212A-212C and partially aft of airfoils 212A-212C.

As shown in FIG. 3C, airfoil structure 202 can have an angle of attack α relative to axis AA. Angle of attack α can be defined as the angle between horizontal axis AA and an axis extending along the chord length of airfoil structure 202 between the leading edge and the trailing edge, as defined below. Motor 218, for example, can be added to airfoil structure 202 to adjust angle of attack α. Motor 218 can be located within airfoil structure 202 and can be powered by any suitable source such as the wind turbine itself, the grid or a battery. Angle of attack α can be adjusted to suit wind conditions. For example, angle of attack α can be set to zero in severe wind conditions to reduce stress on airfoil structure 202. However, the present inventors have found that an angle of attack α of fifteen degrees works well in most or all wind conditions.

Figure 4:
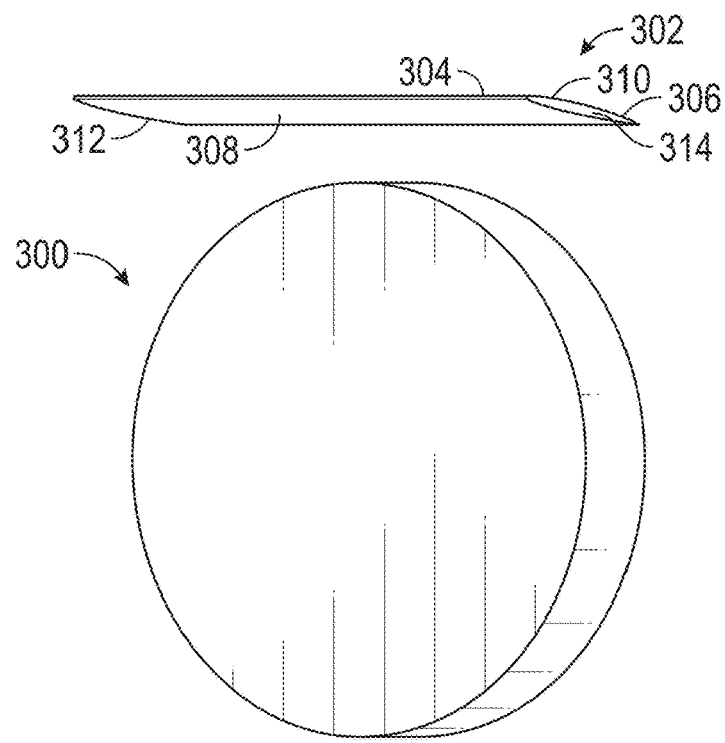
FIG. 4 is a schematic perspective view of a wind turbine airfoil rotor having an outboard mounted static airfoil structure with a straight span.

FIG. 4 is a schematic perspective view of wind turbine airfoil rotor 300 having outboard mounted static airfoil structure 302 with a straight span. Wind turbine airfoil rotor 300 schematically represents airfoils 212A-212C and rotor 210 of FIGS. 3A-3C as a rotating disk. Airfoil structure 302 is schematically shown placed relative to airfoil rotor 300. Airfoil structure 302 can be supported relative to airfoil rotor 300 via any suitable means, such as by struts 216A-216B and nacelle 208 of FIGS. 3A-3C.

Airfoil structure 302 can include leading edge 304, trailing edge 306, pressure side 308 and suction side 310. Airfoil structure 302 can extend between first end 312 and second end 314. Leading edge 304 can face toward incoming wind and pressure side 308 can face down toward the ground and airfoil rotor 300. The span of airfoil structure 302 between first end 312 and second end 314 can be straight. Airfoil structure 302 is shown radially outward of airfoils 212A-212C in an outboard direction. Airfoil structure 302 is also located radially in-line with airfoils 212A-212C. Airfoil structure 302 can be configured to push faster moving air down into the wake of airfoil rotor 300.

Figure 5A:
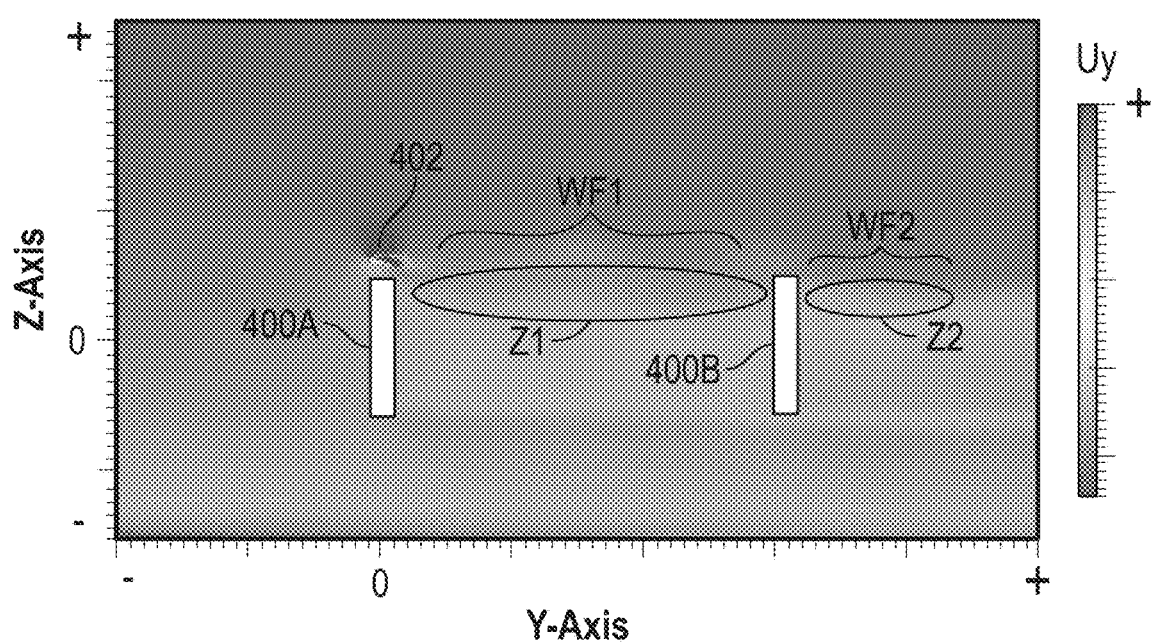
FIG. 5A is a graph illustrating wind velocity in a wind turbine farm illustrating an upwind wind turbine and a downstream wind turbine.
Figure 5B:
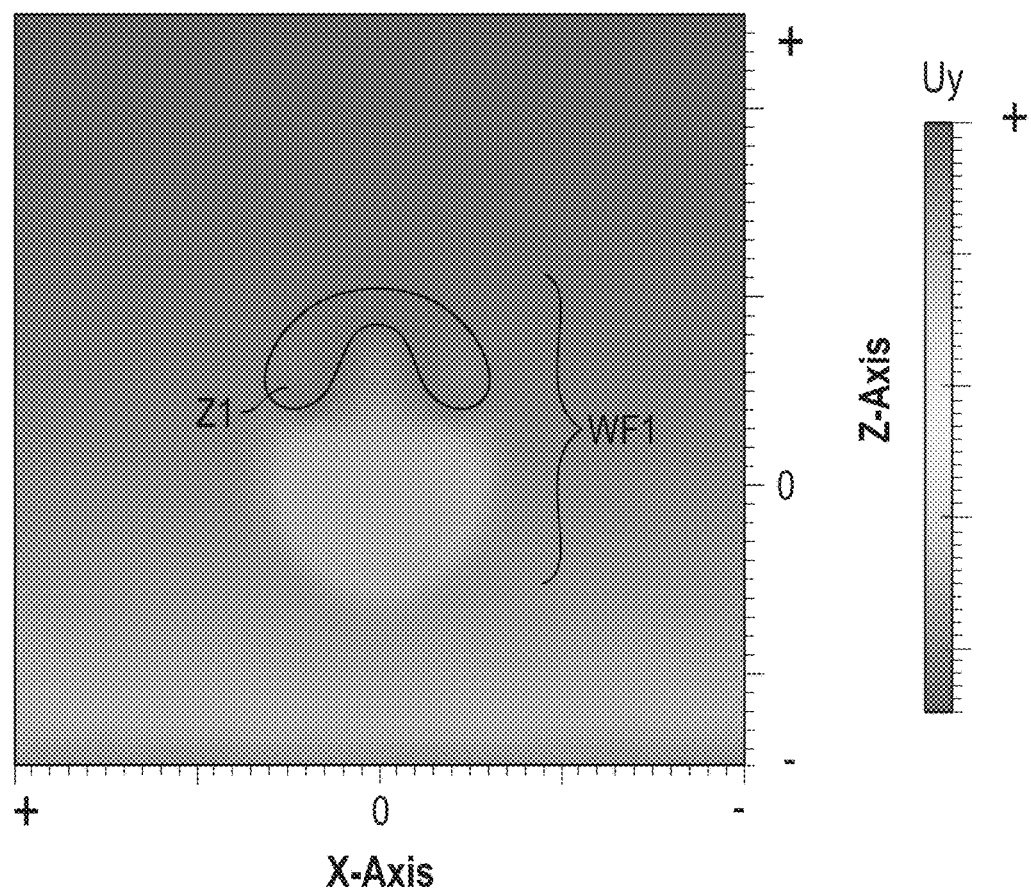
FIG. 5B is a graph illustrating wind velocity leaving the upwind wind turbine of FIG. 5 as influenced by the static airfoil structure of FIG. 4.

FIG. 5A is a graph illustrating wind velocity in a wind turbine farm illustrating upwind wind turbine 400A and downstream wind turbine 400B. Wind turbine 400A can include static airfoil structure 402. Wind turbine 400A can comprise a side view of airfoil rotor 300 of FIG. 4. Static airfoil structure 402 can comprise airfoil structure 302 of FIG. 4. FIG. 5B is a graph illustrating wind velocity leaving the upwind wind turbine 400A of FIG. 5 as influenced by static airfoil structure 402.

The horizontal Y-axis (FIG. 5A) represents distance from the center of wind turbine 400A, the horizontal X-axis (FIG. 5B) represents distance from the center of wind turbine 400A, the left-hand vertical Z-axis represents distance from the center of wind turbine 400A, and the right-hand vertical Z-axis (FIG. 5A) represents wind speed, Uy, which may be meters per second. As can be seen in FIGS. 5A and 5B, wind speed increases the further away from the Y and X axes the wind is located, that is further away from the ground. Additionally, FIG. 5A shows that wind turbine 400A produces wake field WF1 that includes slower moving air than is above and below wind turbine 400A. Wind from wake field WF1 feeds into wind turbine 400B and, as can be seen in FIG. 5A, wake field WF2 includes even slower air than wake field WF1. However, as can be seen in FIG. 5B, airfoil structure 402 can force faster moving air from above (outboard of) wind turbine 400A into zone Z1 of wake field WF1. Thus, wake field WF2 can include zone Z2 of faster moving air relative to what would have occurred without the presence of airfoil structure 402.

Figure 6:
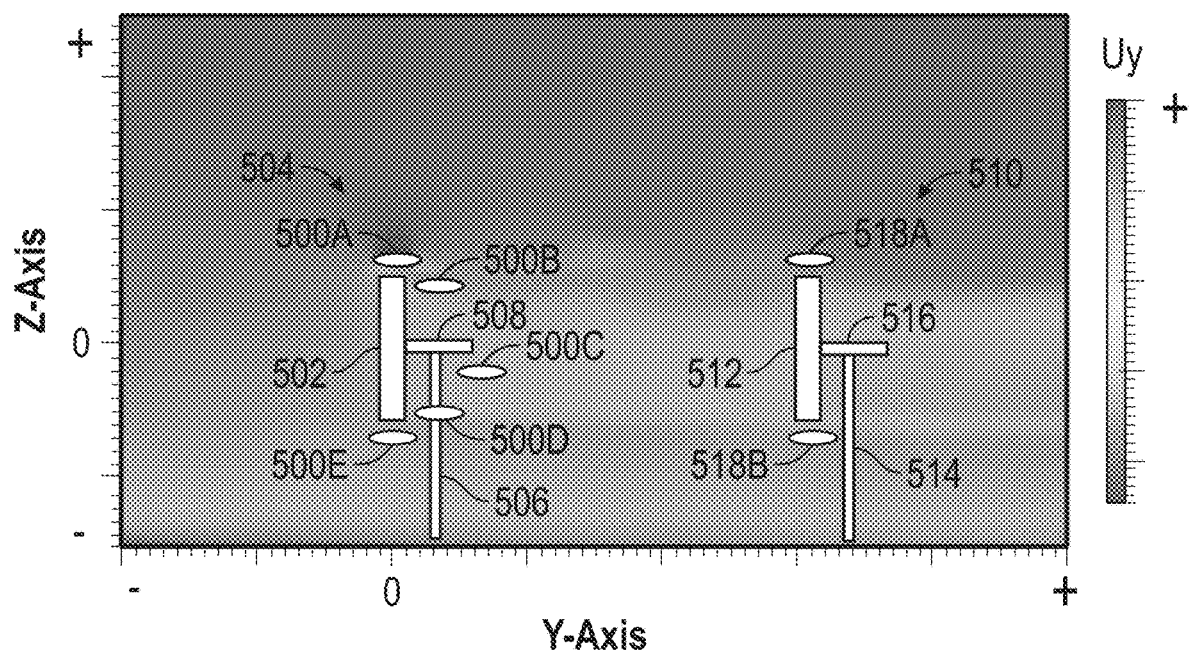
FIG. 6 is a diagram illustrating various example locations for static airfoil structures relative to a span of airfoils for the wind turbine airfoil rotor.

FIG. 6 is a diagram illustrating various example locations for static airfoil structures 500A, 500B, 500C, 500D and 500E relative to a span of airfoils for wind turbine airfoil rotor 502 of wind turbine 504. Wind turbine 504 can include tower 506 and nacelle 508. FIG. 6 also shows wind turbine 510, which can include rotor 512, tower 514 and nacelle 516. Wind turbine 510 can include static airfoil structures 518A and 518B. FIG. 6 illustrates the various locations of airfoils structures 500A-500E and airfoil structures 518A and 518B. Various embodiments of the present disclosure can include any one, all, or any combination of airfoils structures 500A-500E and airfoil structures 518A and 518B.

Airfoil structure 500A is radially outward of the tips of rotor 502, radially in-line with rotor 502 and outboard of nacelle 508.

Airfoil structure 500B is radially inward of the tips of rotor 502, axially aft of rotor 502 and outboard of nacelle 508.

Airfoil structure 500C is radially inward of the tips of rotor 502, axially aft of rotor 502 and inboard of nacelle 508.

Airfoil structure 500D is radially inward of the tips of rotor 502, axially aft of rotor 502 and inboard of nacelle 508.

Airfoil structure 500E is radially outward of the tips of rotor 502, radially in-line with rotor 502 and inboard of nacelle 508.

Airfoil structure s 518A and 518B are positioned similarly to airfoil structures 500A and 500E, respectively.

Figure 7:
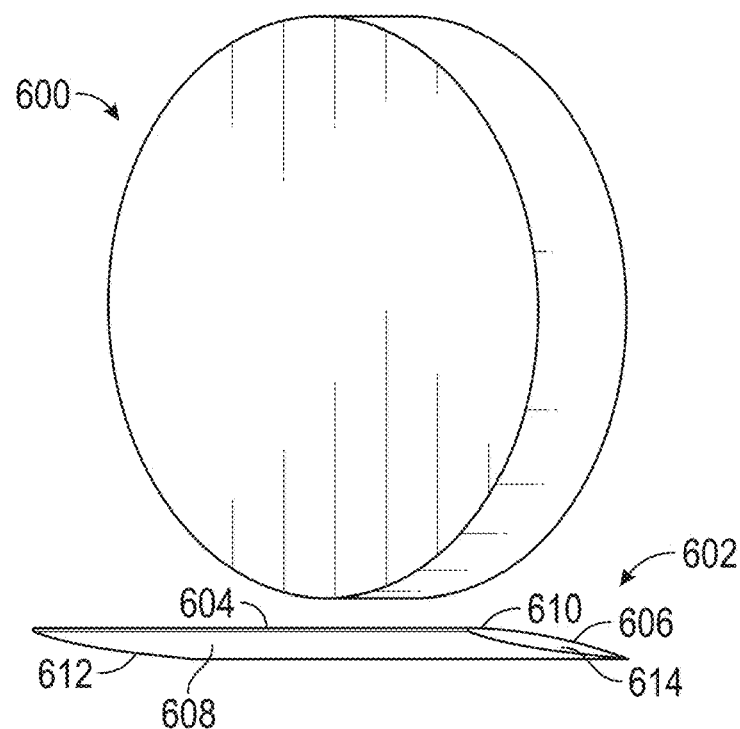
FIG. 7 is a schematic perspective view of a wind turbine airfoil rotor having an inboard mounted static airfoil structure with a straight span.

FIG. 7 is a schematic perspective view of wind turbine airfoil rotor 600 having inboard mounted static airfoil structure 602 with a straight span.

Airfoil structure 602 can include leading edge 604, trailing edge 606, pressure side 608 and suction side 610. Airfoil structure 602 can extend between first end 612 and second end 614. Leading edge 604 can face toward incoming wind and pressure side 608 can face down toward the ground away from airfoil rotor 600. The span of airfoil structure 602 between first end 612 and second end 614 can be straight. Airfoil structure 602 is shown radially outward of airfoil rotor 600 in an inboard direction. Airfoil structure 602 is also located radially in-line with airfoil rotor 600. Airfoil structure 602 can be configured to push slower moving air down out of the wake of airfoil rotor 600.

Figure 8:
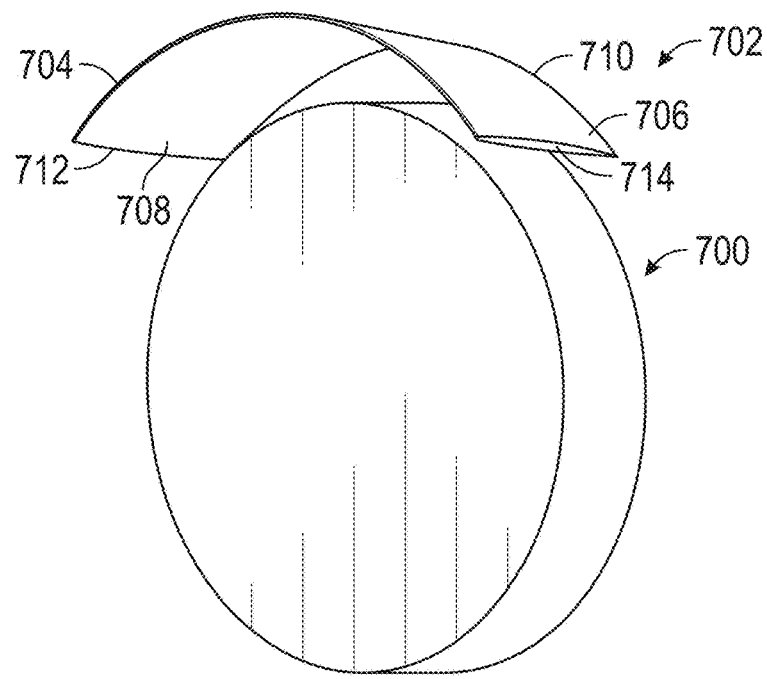
FIG. 8 is a schematic perspective view of a wind turbine airfoil rotor having an outboard mounted static airfoil structure with a curved span.

FIG. 8 is a schematic perspective view of wind turbine airfoil rotor 700 having outboard mounted static airfoil structure 702 with a curved span.

Airfoil structure 702 can include leading edge 704, trailing edge 706, pressure side 708 and suction side 710. Airfoil structure 702 can extend between first end 712 and second end 714. Leading edge 704 can face toward incoming wind and pressure side 708 can face down toward the ground and airfoil rotor 700. The span of airfoil structure 702 between first end 712 and second end 714 can be curved. Airfoil structure 702 is shown radially outward of airfoil rotor 700 in an outboard direction. Airfoil structure 702 is also located radially in-line with airfoil rotor 700. Airfoil structure 702 can be configured to push faster moving air down into the wake of airfoil rotor 700.

Figure 9:
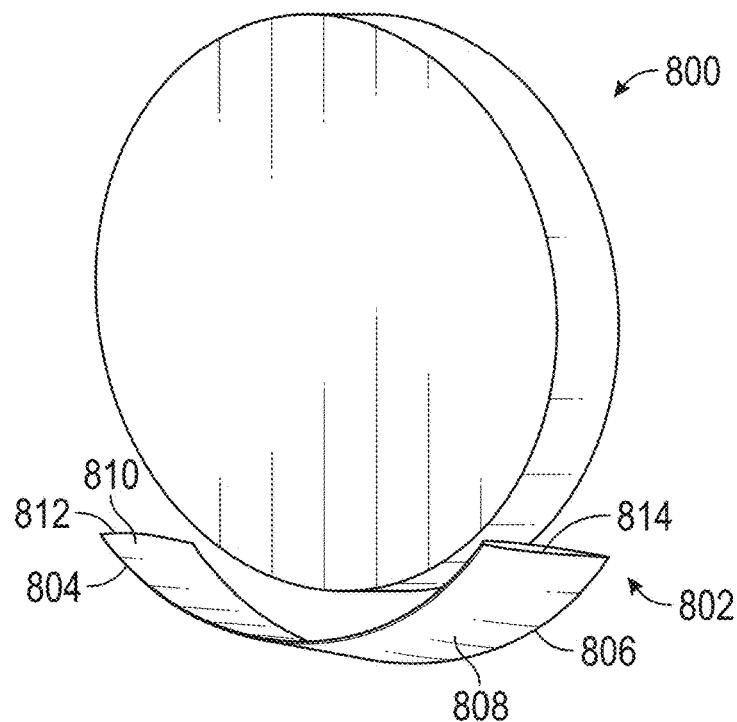
FIG. 9 is a schematic perspective view of a wind turbine airfoil rotor having an inboard mounted static airfoil structure with a curved span.

FIG. 9 is a schematic perspective view of wind turbine airfoil rotor 800 having inboard mounted static airfoil structure 802 with a curved span.

Airfoil structure 802 can include leading edge 804, trailing edge 806, pressure side 808 and suction side 810. Airfoil structure 802 can extend between first end 812 and second end 814. Leading edge 804 can face toward incoming wind and pressure side 808 can face down toward the ground away from airfoil rotor 800. The span of airfoil structure 802 between first end 812 and second end 814 can be curved. Airfoil structure 802 is shown radially outward of airfoil rotor 800 in an inboard direction. Airfoil structure 802 is also located radially in-line with airfoil rotor 800. Airfoil structure 802 can be configured to push slower moving air down out of the wake of airfoil rotor 800.

Figure 10:
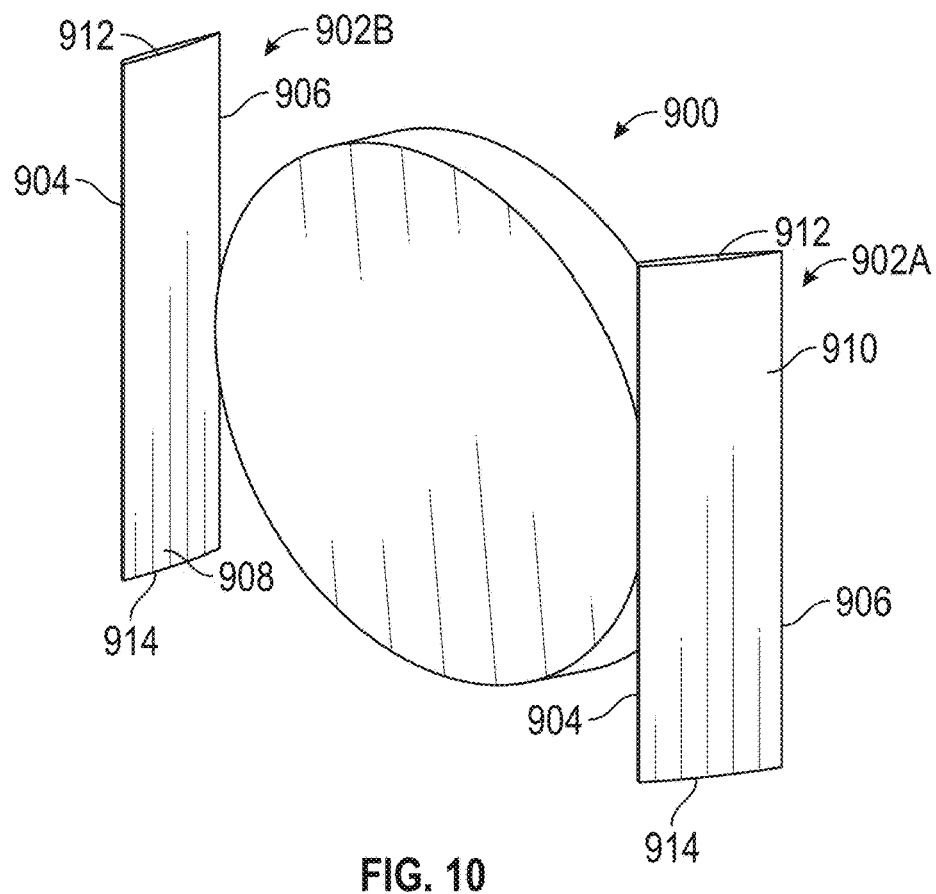
FIG. 10 is a schematic perspective view of a wind turbine airfoil rotor having a pair of laterally mounted static airfoil structures with straight spans.

FIG. 10 is a schematic perspective view of wind turbine airfoil rotor 900 having a pair of laterally mounted static airfoil structures 902A and 902B with straight spans.

Airfoil structures 902A and 902B can each include leading edge 904, trailing edge 906, pressure side 908 and suction side 910. Airfoil structures 902A and 902B can each extend between first end 912 and second end 914. Leading edges 904 can face toward incoming wind, while pressure sides 908 can face toward airfoil rotor 900 and suction sides 910 can face away from airfoil rotor 900. The span of airfoil structures 902A and 902B between first end 912 and second end 914 can be straight. Airfoil structures 902A and 902B are shown radially outward of airfoil rotor 900 in lateral directions. Airfoil structures 902A and 902B are also located radially in-line with airfoil rotor 900. Airfoils structure 902A and 902B can be configured to pull faster moving into the wake of airfoil rotor 900.

Figure 11:
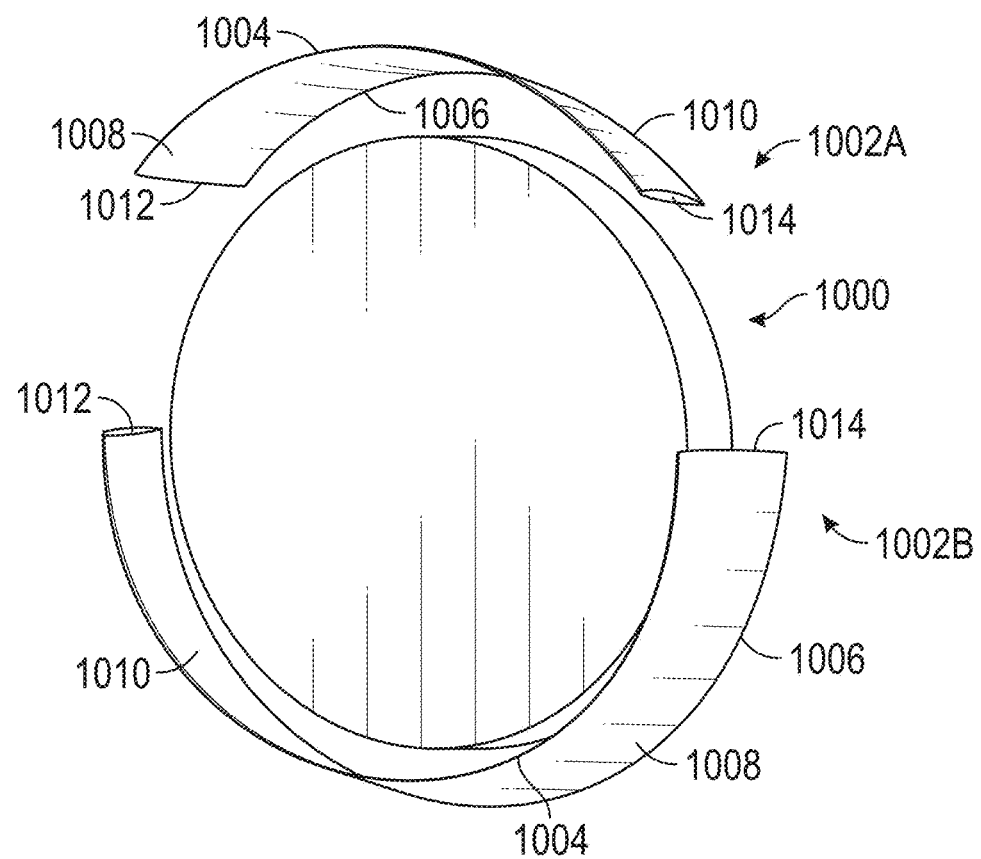
FIG. 11 is a schematic perspective view of a wind turbine airfoil rotor having a pair of longitudinally mounted static airfoil structures with curved spans.

FIG. 11 is a schematic perspective view of wind turbine airfoil rotor 1000 having a pair of longitudinally mounted static airfoil structures 1002A and 1002B with curved spans.

Airfoil structures 1002A and 1002B can each include leading edge 1004, trailing edge 1006, pressure side 1008 and suction side 1010. Airfoil structures 1002A and 1002B can each extend between first end 1012 and second end 1014. For airfoil structure 1002A, leading edge 1004 can face toward incoming wind and pressure side 1008 can face down toward the ground and airfoil rotor 1000. For airfoil structure 1002B, leading edge 1004 can face toward incoming wind and pressure side 1008 can face down toward the ground away from airfoil rotor 1000. The span of airfoil structures 1002A and 1002B between first end 1012 and second end 1014 can be curved. Airfoil structures 1002A and 1002B are shown radially outward of airfoil rotor 1000 in outboard and inboard directions, respectively. Airfoil structures 1002A and 1002B are also located radially in-line with airfoil rotor 1000. Airfoil structure 1002A can be configured to push faster moving air down into the wake of airfoil rotor 1000 and airfoil structure 1002B can be configured to push slower moving air out of the wake of airfoil rotor 1000.

In the illustrated embodiment, airfoil structure 1002A encircles approximately 30 percent of the circumference of airfoil rotor 1000 while airfoil structure 1002B encircles approximately 50 percent of the circumference of airfoil rotor 1000. In various embodiments, airfoil structures 1002A and 1002B can be split in a 25/50, 25/45, 30/50, 30/45, 35/50 or 35/45 relationship, respectively, relative to a 100 percent span of the circumference of airfoil rotor 1000.

In other embodiments, airfoil structures 1002A and 1002B can completely encircle airfoil rotor 1000. In various embodiments, airfoil structures 1002A and 1002B can be split in a 40/60, 45/55, 50/50, 55/45 or 60/40 relationship, respectively, relative to a 100 percent span of the circumference of airfoil rotor 1000.

Figure 12A:
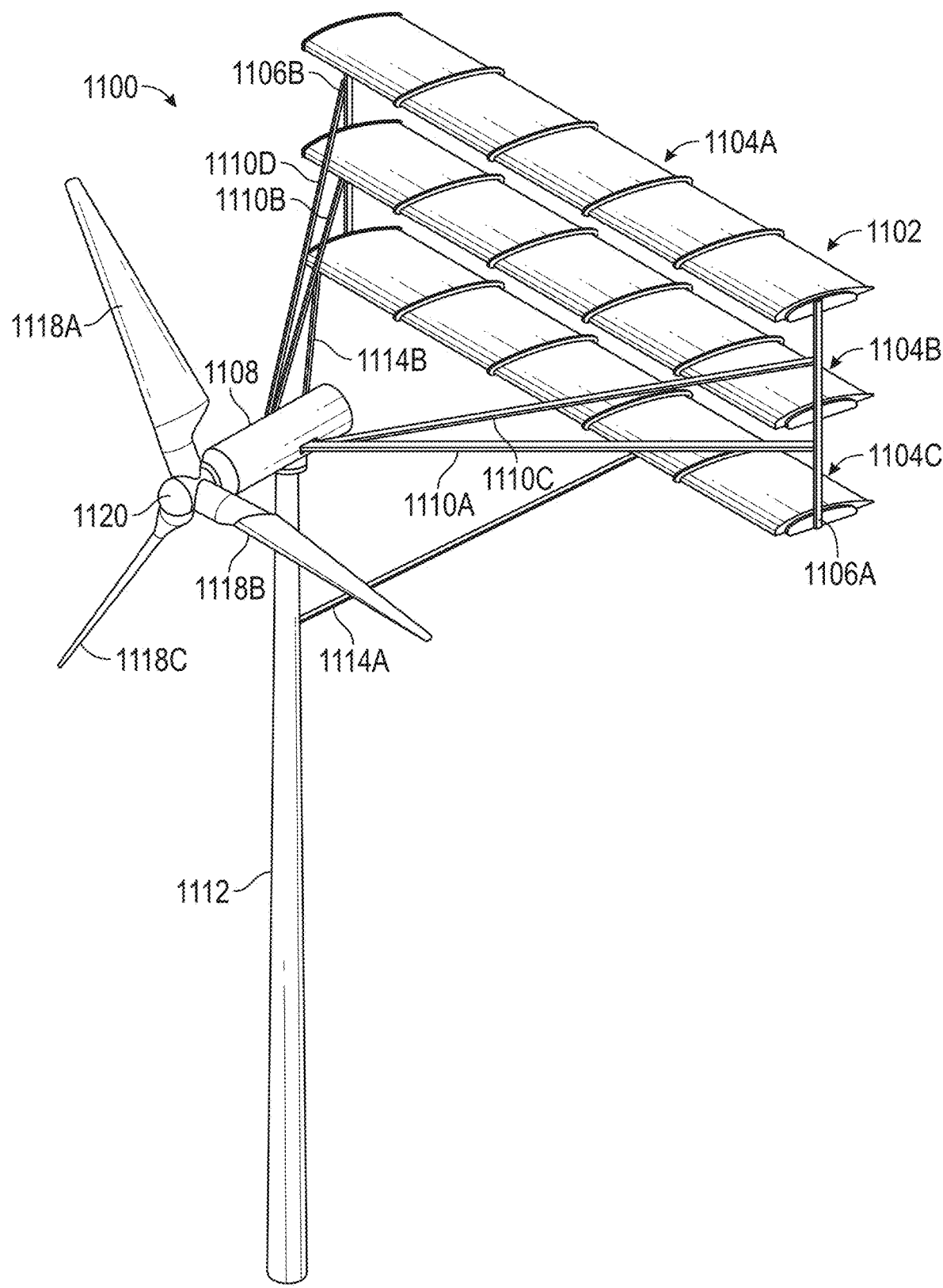
FIG. 12A is a schematic perspective view of a wind turbine system incorporating an example static airfoil structure having a plurality of stacked airfoils.

FIG. 12A is a schematic perspective view of wind turbine system 1100 incorporating static airfoil structure 1102 having a plurality of stacked airfoils 1104A, 1104B and 1104C. Airfoils 1104A-1104C can be connected to each other via struts 1106A and 1106B. Airfoils 1104A-1104C can be connected to nacelle 1108 via struts 1110A, 1110B, 1110C and 1110D. Struts 1110A-1110D can be connected to tower 1112 via struts 1114A and 1114B. Wind turbine 1116 can include turbine airfoils 1118A, 1118B and 1118C, and rotor 120.

Figure 12B:
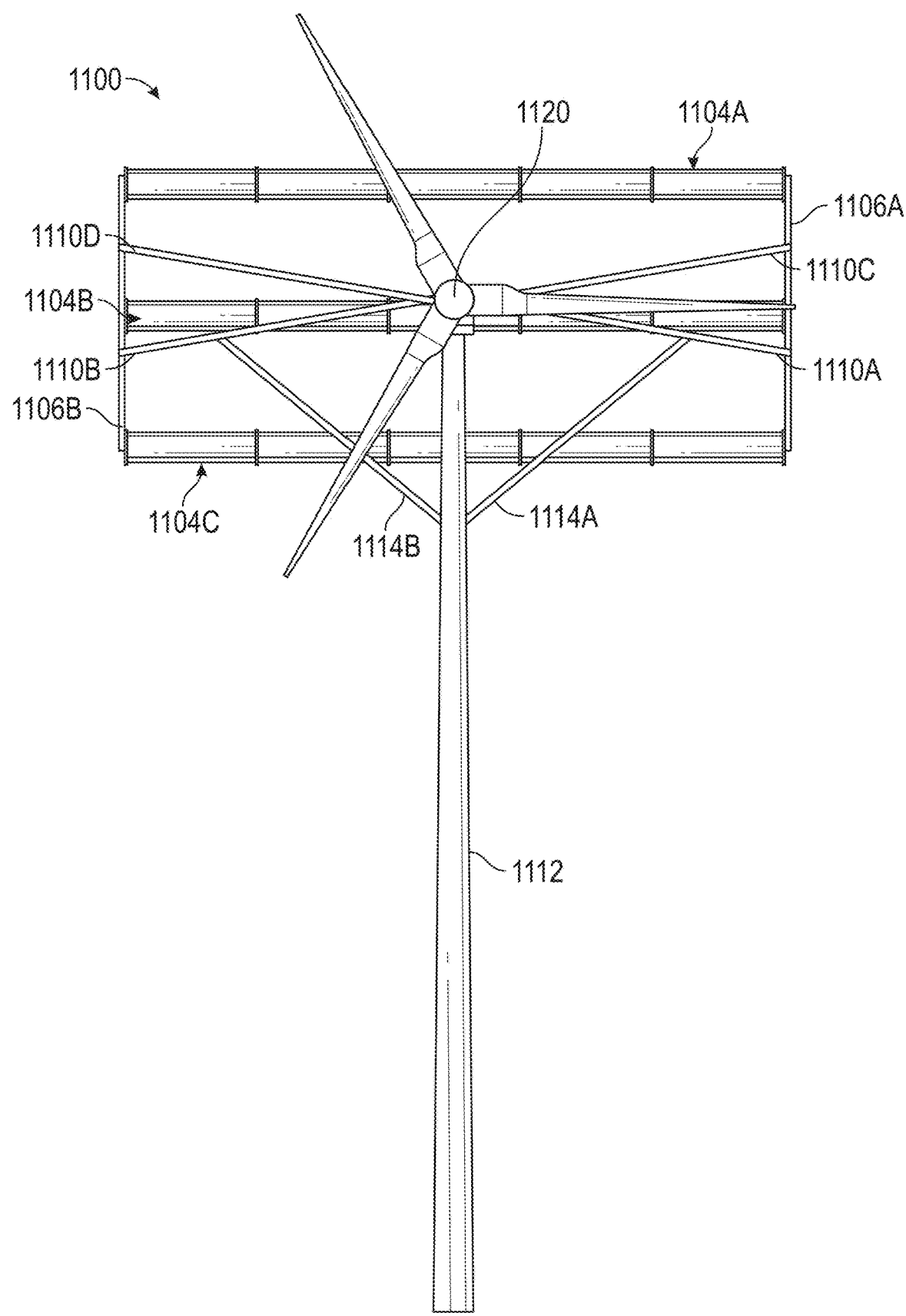
FIG. 12B is a front view of the wind turbine system and static airfoil structure of FIG. 12A.
Figure 12C:
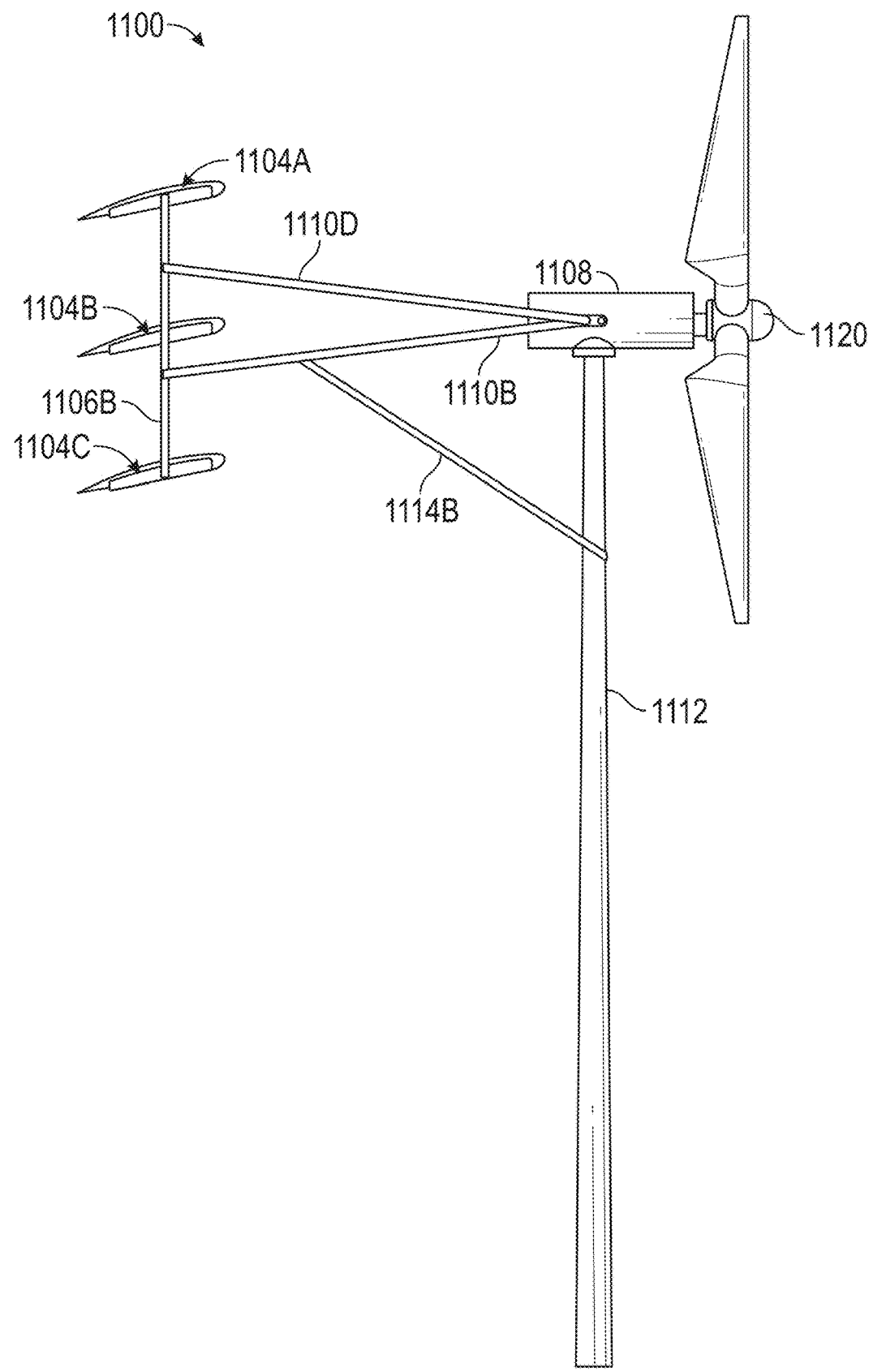
FIG. 12C is a side view of the wind turbine system and static airfoil structure of FIG. 12A.

FIG. 12B is a front view of the wind turbine system 1100 and static airfoil structure 1102 of FIG. 12A. FIG. 12C is a side view of wind turbine system 1100 and static airfoil structure 1102 of FIG. 12A. In the example shown, airfoils 1104A-1104C can be disposed is a stacked configuration downstream of turbine airfoils 1118A-1118C. Airfoils 1104A-1104C can be stacked so that lateral side edges of each of airfoils 1104A-1104C are vertically aligned. Airfoils 1104A-1104C can be centered relative to rotor 1120 such that the center of airfoil 1104B is centered on rotor 1120 and airfoils 1104A and 1104C are equally spaced above and below airfoil 1104B, respectively.

Figure 13:
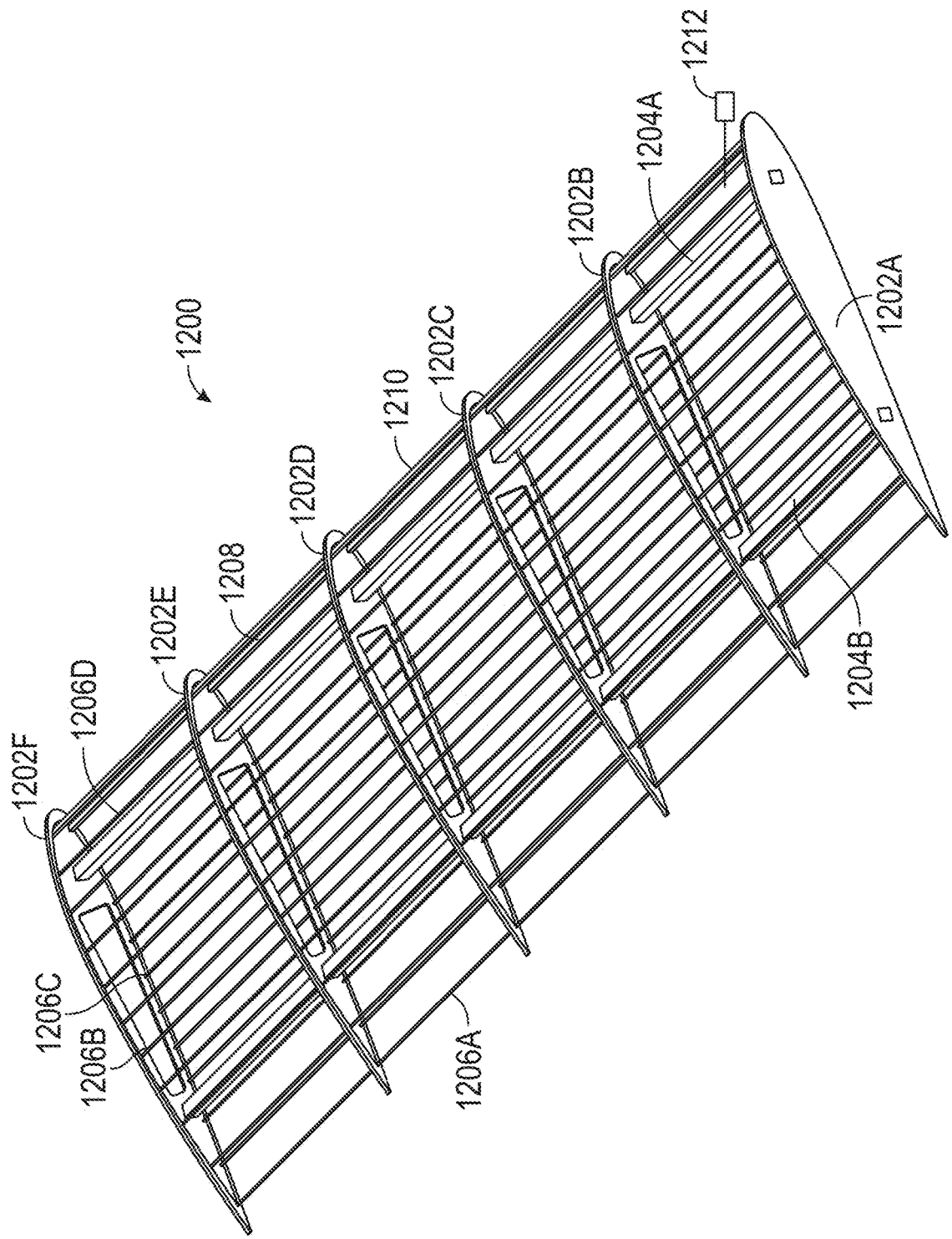
FIG. 13 is a perspective view of an exemplary airfoil structure comprising a plurality of frame members connected by a plurality of crossbeams and a plurality of skin support rods.

FIG. 13 is a perspective view of exemplary airfoil structure 1200 comprising frame members 1202A, 1202B, 1202C, 1202D, 1202E and 1202F connected by crossbeams 1204A and 1204B and a plurality of skin support rods 1206, such as skin support rods 1206A, 1206B and 1206C. Airfoil structure 1200 can also include roller 1208 and leading edge body 1210.

Frame members 1202A-1202F can have the profile of an airfoil, such as with a leading edge, a trailing edge, a pressure side and a suction side. In an example, frame members 1202A-1202F can each have a NACA 2412 airfoil profile. Frame members 1202A-1202F can be rigid bodies that can be used to support a skin structure forming outer, pressure side and suction side surfaces of airfoil structure 1200. Frame members 1202A-1202F can be made of strong and lightweight materials, such as steel, carbon fiber, fiberglass, wood or aluminum, and can include weight reducing cut-outs.

Crossbeams 1204A and 1204B can comprise rigid bodies that support frame members 1202A-1202B as a rigid unified structure. Crossbeams 1204A and 1204B can be made of material capable of resisting twisting and bending from wind-induced forces. Such materials can include steel, carbon fiber, fiberglass, wood and aluminum.

Support rods 1206 can comprise elongate rigid bodies configured to support the skin structure in the pressure side and suction side shape. For example, support rods 1206 can comprise small diameter poles extending through or into frame members 1202A-1202F near or at the pressure and suction side surfaces. Thus, a pliable or rigid skin structure can be applied over support rods 1206 to provide airfoil structure 1200 with aerodynamic surfaces for inducing lift or, in other words, for bending flow of air over airfoil structure 1200.

Leading edge body 1210 can comprise an aerodynamically shaped body that can provide multiple functions, such as connecting frame members 1202A-1202F and providing a cover for roller 1208. Roller 1208 can be disposed at least partially within leading edge body 1210 and can be configured to rotate between frames 1202A and 1202F. One or more pliable skin structures, such as cloth, fiber, plastic or metallic sheets, can be wound around roller 1208. Roller 1208 can be powered, such as with electric motor 1212, to wind and unwind, or furl and unfurl, the skin structures along the pressure and suction sides of airfoil structure 1200. Electric motor 1212 can be located within airfoil structure 1200 and can be powered by any suitable source such as the wind turbine itself, the grid or a battery.

In an example, the skin structure can function as an awning or umbrella structure. Under low wind conditions the skin structure can remain unrolled or unfurled and can hang or slide along frame members 1202A-1202F. Under high load conditions frame members 1202A-1202F can be put into tension as the wind pulls on airfoil structure 1200, which can be supported by frame members 1202A-1202F. In severe weather the skin structure sheets can be rolled up or furled up onto roller 1208 or another suitable structure, to reduce wind tension on airfoils structure 1200.

Figure 14:
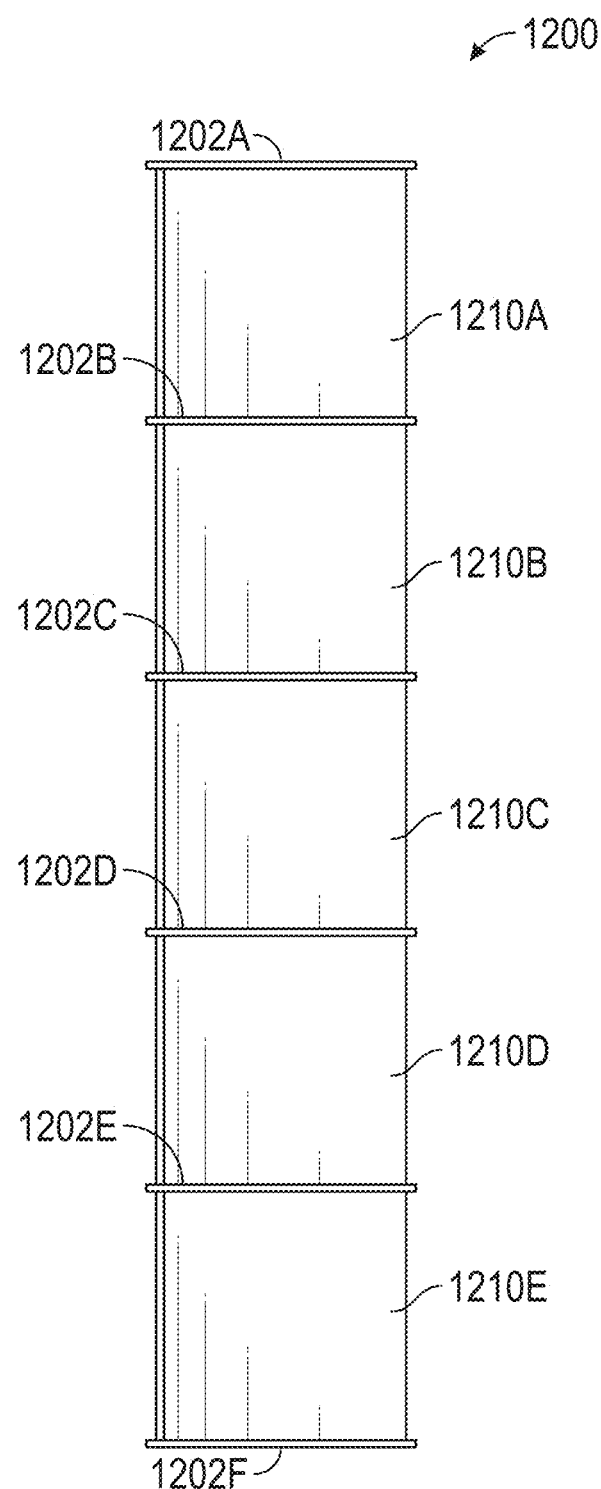
FIG. 14 is a top view of the airfoil structure of FIG. 13 showing a plurality of skins laid out over the skin support rods.

FIG. 14 is a top view of airfoil structure 1200 of FIG. 13 showing skins 1210A, 1210B, 1210C, 1210D and 1210E laid out over skin support rods 1206 (FIG. 13). Each of skins 1210A-1210E can be rolled up on roller 1208 (FIG. 13). In various embodiments, roller 1208 can be divided into a number of rollers to match the number of skins. FIG. 14 illustrates skins 1210A-1210E forming a suction side of airfoil structure 1200. Additional skins can be added to form a pressure side of airfoil structure 1200. Alternatively, skins 1210A-1210E can be configured to wrap around both of the pressure and suction sides of airfoil structure 1200. Alternatively, skins for the pressure side can be omitted.

Further description and illustration of the various static airfoils structures described herein is provided in the Appendices of U.S. Provisional Patent Application Ser. No. 62/687,026. The Appendices include reference to particular embodiments having specific material and dimensions that are example embodiments. The particular configurations described and illustrated in the Appendices can be modified based on particular applications and design preferences.

This disclosure is directed to using static fixed airfoils in proximity to a wind turbine to control the airflow coming out of the turbine for use with, for example, a downstream turbine. These control devices have at least three beneficial effects. (1) They gather air from "higher up" where the air is moving faster on average (and therefore has more potential energy in it). (2) They throw the used (and slowed down air) air downwards. This means that any turbines in the wind farm behind the lead turbines do not get "stale" (already slowed down) air. (3) These control devices provide a large stabilizing lifting force for floating off-shore turbines, which are likely to eventually dominate the wind-power sector.

In examples, various configurations can use a streamlined (airfoil shaped) structure, at an angle of attack close to 15°, close to the upstream wind turbine so as to create a significant downwash of the faster wind from upper layers of atmospheric boundary layer. This downwash can energize the wake and as a result feed faster wind to the downstream turbine which would otherwise receive low speed wind due to its presence in the wake of the upstream turbine.

This design is simple, practical to implement, and improves the performance of wind turbines especially in "farm" settings. Wind turbine power output is proportional to the third power of the velocity. This means a small increase in inflow wind speeds (such as 10%) produces a large effect on the final power output (over 30%). Simulations have shown power increase in downstream wind turbines as large as 48%. Various examples of the benefits of the structures described herein can be found in Improving the Wind Farm Efficiency by Increasing the Rate of Vertical Mixing and Kinetic Energy Entrainment Using Novel Airfoil-Shaped Designs Around the Wind Turbines by Shujaut H. Bader, which can be found in the Appendices of U.S. Provisional Patent Application Ser. No. 62/687,026.

The devices described herein can be retrofitted to existing wind turbines. They can be constructed nearby (and not on) a wind turbine and subsequently mounted or attached to the wind turbine. They can enhance the competitiveness of wind energy and enable the acceleration of off-shore wind energy (because they solve a separate stability problem).

The devices and methods described herein can be used by installers of wind turbines, which tend to be utility companies. Wind turbine manufacturers can also utilize the devices and methods described herein. The devices described herein can be sold with a wind turbine unit or as an add-on feature. For example, floating off-shore wind turbines can be sold as a whole package (turbine, floating structure, mooring system, etc.) and the static airfoil structures described herein can be a component of that package to facilitate structure stability.

In addition, it is possible that the static airfoil devices described herein can allow full power recovery and closer spacing of all the wind turbines in a wind farm, which can lower capital and operating costs.

Various Notes

Each of the non-limiting examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. For example, various static airfoil structures are described herein as being directly radially outward of a turbine airfoil rotor. However, the various static airfoil structures can be slightly forward of the turbine airfoil rotor, slightly behind the turbine airfoil rotor or completely behind the turbine airfoil rotor.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A wind turbine comprising:
   a nacelle;
   a drive shaft extending from the nacelle along a shaft axis;
   a plurality of turbine blades coupled to the drive shaft and extending radially relative to the shaft axis; and
   a first static airfoil structure coupled to the wind turbine to influence airflow exiting the plurality of turbine blades;

wherein the plurality of turbine blades are configured to generate a wake field;
wherein the first static airfoil structure is configured to push wake field air toward ground level; and
wherein a majority of a span of the first static airfoil structure is configured to push wake field air toward ground level.

2. The wind turbine of claim 1, wherein the first static airfoil structure is static relative to the nacelle.

3. The wind turbine of claim 1, wherein the first static airfoil structure is positioned radially outward of the plurality of turbine blades.

4. The wind turbine of claim 1, wherein:
each of the plurality of turbine blades includes an inner end portion connected to the drive shaft and an outer tip portion; and
the first static airfoil structure is positioned radially inward of the distal tip portions of the plurality of turbine blades.

5. The wind turbine of claim 1, wherein:
each of the plurality of turbine blades includes a leading edge and a trailing edge, and the nacelle is positioned aft of the trailing edge; and
the first static airfoil structure is positioned axially aft of the plurality of turbine blades.

6. The wind turbine of claim 1, wherein:
the nacelle defines an inboard side and an outboard side, the wind turbine further comprising a mounting shaft extending from the inboard side of the nacelle along a longitudinal axis; and
the first static airfoil structure is supported by the nacelle.

7. The wind turbine of claim 6, wherein the first static airfoil structure is mounted outboard of the nacelle such that the first static airfoil structure is positioned radially outward of the plurality of turbine blades.

8. The wind turbine of claim 6, wherein the first static airfoil structure is mounted inboard of the nacelle such that the first static airfoil structure is positioned radially inward of the plurality of turbine blades.

9. The wind turbine of claim 6, further comprising a second static airfoil structure supported by the nacelle to influence airflow exiting the plurality of turbine blades, wherein the first static airfoil structure and the second static airfoil structure are each configured to push wake field air toward ground level to allow wake field air to be displaced by faster moving air located outside the wake field.

10. The wind turbine of claim 9, wherein the first and second static airfoil structures are positioned longitudinally apart from each other on opposite sides of the nacelle.

11. The wind turbine of claim 1, wherein the first static airfoil structure comprises an airfoil comprising:
a leading edge for facing in an upwind direction;
a trailing edge for facing in a downwind direction;
a pressure side extending between the leading and trailing edges; and
a suction side extending between the leading and trailing edges;
wherein the suction side faces the plurality of turbine blades.

12. The wind turbine of claim 11, wherein the first static airfoil structure is arcuate along a span extending between ends of the first static airfoil structure.

13. The wind turbine of claim 12, wherein the first static airfoil structure has an angle of attack of fifteen degrees relative to the shaft axis.

14. The wind turbine of claim 13, further comprising a mechanism to adjust the angle of attack.

15. The wind turbine of claim 1, wherein the first static airfoil structure comprises a metal structure mounted to the nacelle by a plurality of struts.

16. The wind turbine of claim 1, wherein the first static airfoil structure comprises:
a rigid frame structure and a skin at least partially covering the rigid frame structure; and
a furling mechanism for furling and unfurling the skin.

17. A method of increasing wind turbine power efficiency in a wind farm, the method comprising:
positioning a first wind turbine having a first plurality of turbine blades at least partially upstream of a second wind turbine having a second plurality of turbine blades;
producing a wake field of exit air behind the first plurality of turbine blades;
directing air outside of the wake field into the wake field to increase speed of airflow in the wake field by pulling air into the wake field using an airfoil structure to displace some of the exit air in the wake field with faster moving air from air outside of the first plurality of turbine blades; and
directing the airflow including the faster moving air into the second plurality of turbine blades of the second wind turbine;
wherein the airfoil structure does not affect performance of the first wind turbine.

18. The method of claim 17, further comprising:
mounting the first wind turbine to a tower; and
attaching a static airfoil structure to a nacelle of the first wind turbine.

19. The method of claim 17, wherein the faster moving air is located outboard of the first plurality of turbine blades.

20. The method of claim 17, wherein the faster moving air is located laterally of the first plurality of turbine blades.

21. The method of claim 17, further comprising adjusting the static airfoil structure to reduce drag in wind conditions.

22. The method of claim 21, further comprising adjusting an angle of attack to reduce drag.

23. The method of claim 21, further comprising furling a skin of the airfoil structure to reduce drag.

24. The wind turbine of claim 1, further comprising a second static airfoil structure supported by the nacelle to influence airflow exiting the plurality of turbine blades, the first and second static airfoil structures each comprising:
a leading edge for facing in an upwind direction;
a trailing edge for facing in a downwind direction;
a pressure side extending between the leading and trailing edges; and
a suction side extending between the leading and trailing edges;
wherein the pressure sides both face toward a groundward direction.

25. The wind turbine of claim 24, wherein:
the first static airfoil structure and the second static airfoil structure are arcuate along a span extending between ends of the first and second static airfoil structures and are positioned radially outward of the plurality of turbine blades;
the first static airfoil structure is positioned above the plurality of turbine blades and extends along less than fifty percent of a circumference of the wind turbine; and
the second airfoil structure is positioned below the plurality of turbine blades and extends along approximately fifty percent of the circumference of the wind turbine.

26. The method of claim 17, wherein the static airfoil structure is configured to not directly mix the faster moving air with the exit air.

27. A wind turbine comprising:
- a nacelle that defines an inboard side and an outboard side;
- a mounting shaft extending from the inboard side of the nacelle along a longitudinal axis;
- a drive shaft extending from the nacelle along a shaft axis;
- a plurality of turbine blades coupled to the drive shaft and extending radially relative to the shaft axis; and
- a first static airfoil structure coupled to the wind turbine to influence airflow exiting the plurality of turbine blades, the first static airfoil structure being supported by the nacelle;
- wherein the plurality of turbine blades are configured to generate a wake field;
- wherein the first static airfoil structure is configured to push wake field air toward ground level; and
- wherein the first static airfoil structure is mounted outboard of the nacelle such that the first static airfoil structure is positioned radially outward of the plurality of turbine blades.

* * * * *

UNITED STATES PATENT AND TRADEMARK OFFICE
CERTIFICATE OF CORRECTION

PATENT NO. : 11,028,822 B2
APPLICATION NO. : 16/288976
DATED : June 8, 2021
INVENTOR(S) : Bader et al.

Page 1 of 1

It is certified that error appears in the above-identified patent and that said Letters Patent is hereby corrected as shown below:

In the Claims

In Column 12, Line 9, in Claim 17, after "power", delete "efficiency"

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*